Nov. 14, 1950        H. D. BENSON        2,529,759

SPRING SCALE

Filed April 23, 1947        3 Sheets-Sheet 1

INVENTOR
Harry D. Benson
BY
ATTORNEYS

Nov. 14, 1950  H. D. BENSON  2,529,759
SPRING SCALE

Filed April 23, 1947  3 Sheets-Sheet 2

INVENTOR
Harry D. Benson
BY
ATTORNEYS

Nov. 14, 1950     H. D. BENSON     2,529,759
SPRING SCALE
Filed April 23, 1947     3 Sheets—Sheet 3
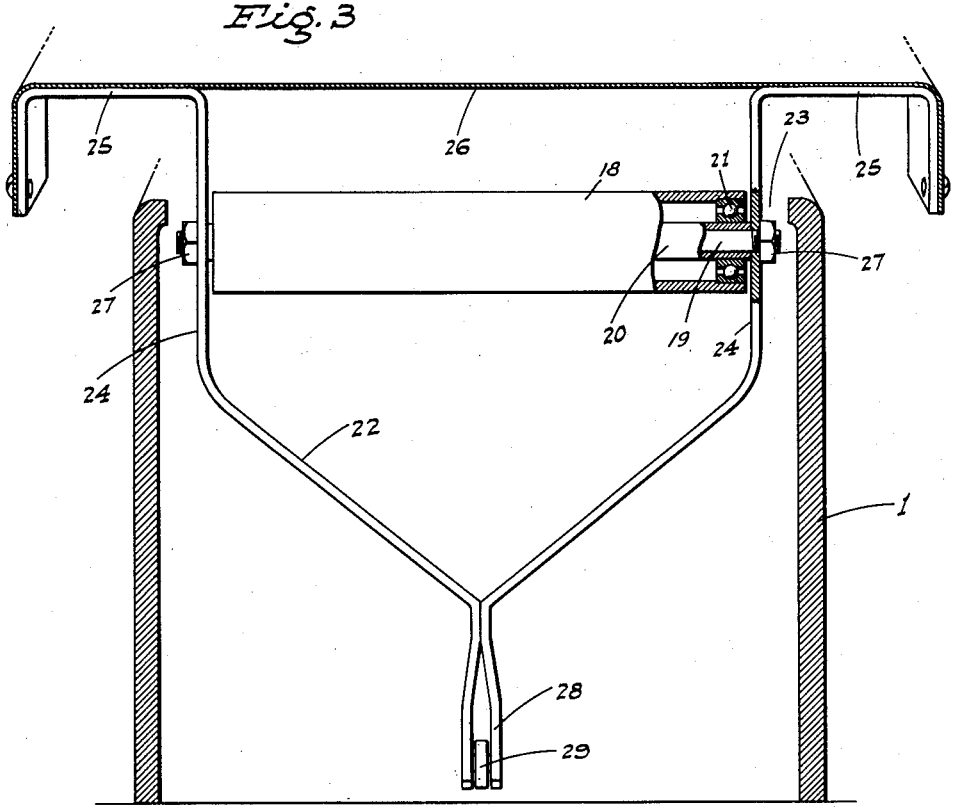
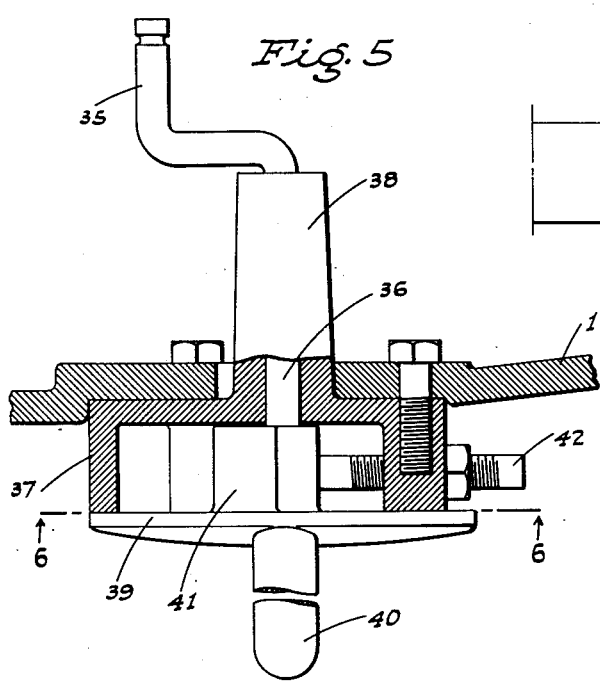
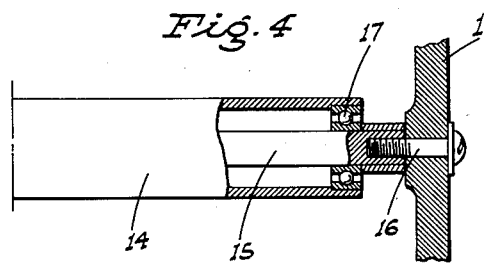
INVENTOR
Harry D. Benson
ATTORNEYS Patented Nov. 14, 1950

2,529,759

UNITED STATES PATENT OFFICE 2,529,759

SPRING SCALE

Harry D. Benson, Fresno, Calif., assignor to General Nailing Machine Corporation, Sanger, Calif., a corporation of California Application April 23, 1947, Serial No. 743,318

9 Claims. (Cl. 265—68)

1

This invention relates to, and it is an object to provide, improved scales, especially a portable type adapted primarily for use in packing houses or the like to indicate accurately and readily the weight of produce in a shipping box.

Another object of the invention is to provide scales, as above, which include a novel quick-change mechanism whereby the scales may be pre-set, manually and selectively, for different scale weights; i. e. to weigh a load of one predetermined weight, or a load of another predetermined weight, with the scale pointer in each instance reading on the same scale marker, and which the eye of the operator is accustomed to watch. This avoids the necessity of different scale markers for different loads and greatly facilitates and accelerates use of the scales where loads of different but predetermined weights may be packed by the same operator.

A further object of the invention is to provide scales, as in the preceding paragraph, wherein said scales are of spring-balanced type, and said quick-change mechanism includes a crank unit connected to the balance spring in a manner such that in one position of said crank unit the spring is under one tension representing one predetermined weight, while in another position the spring is under a different tension representing another predetermined weight; said tensions being manually selectively variable in order to pre-set the scales for two different weights.

An additional object is to provide a unique assembly, in anti-friction relation, of the scale beams, and the platform supporting standard which couples to the scale beams.

A further object of the invention is to provide a practical, ready, convenient, and portable scales, and one which will be exceedingly effective for the purpose for which it is designed.

These objects are accomplished by means of such structure and relative arrangement of parts as will fully appear by a perusal of the following specification and claims.

Fig. 3 is an enlarged transverse section taken directly in front of the platform supporting post.

Fig. 4 is an enlarged fragmentary sectional elevation showing the anti-friction mounting at one end of the main pivot sleeve.

Fig. 5 is an enlarged plan view of the crank unit included in the quick-change mechanism.

Figure 1:
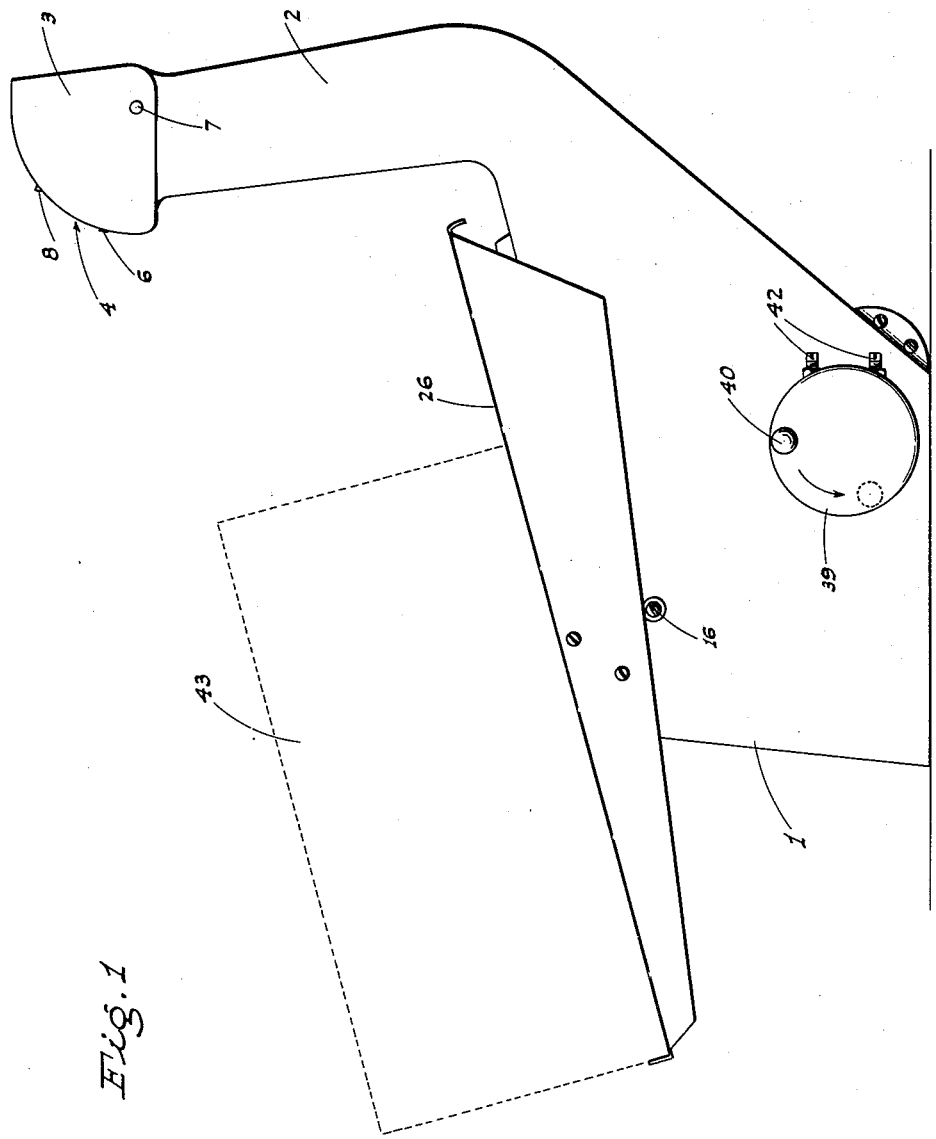
Fig. 1 is a side elevation of the scales as in use.
Figure 2:
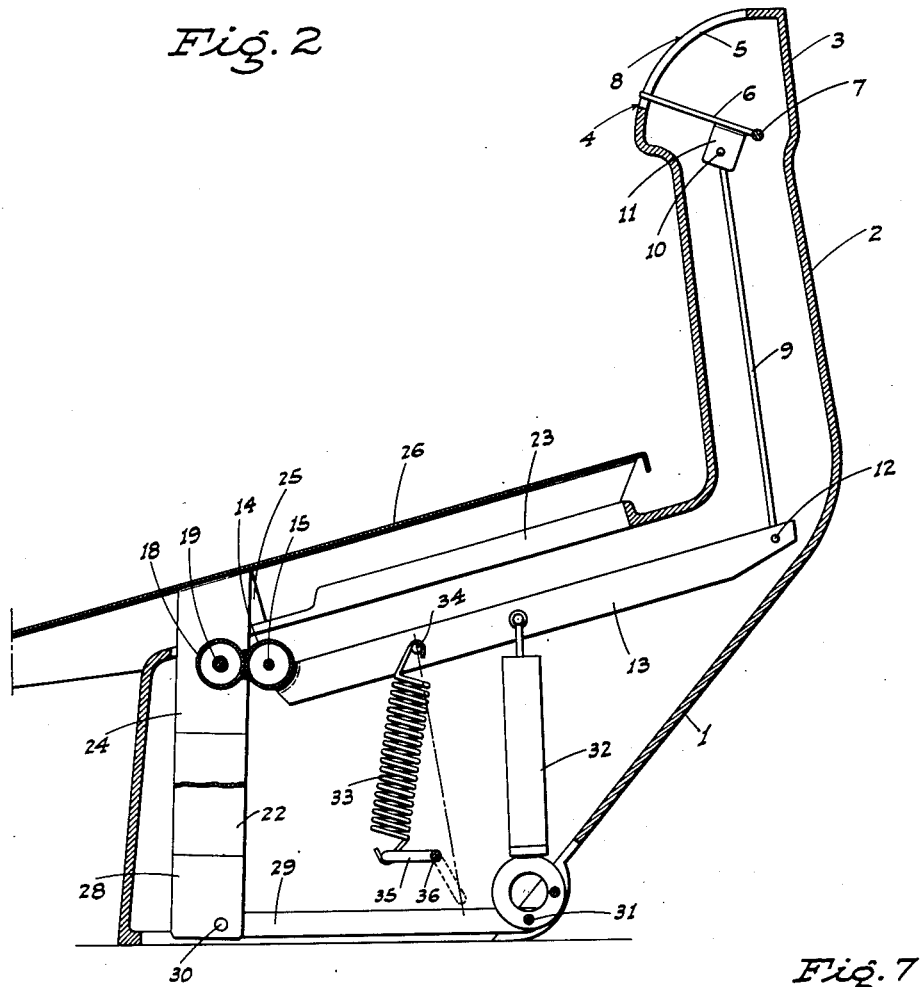
Fig. 2 is a longitudinal sectional elevation of the scales.
Figure 6:
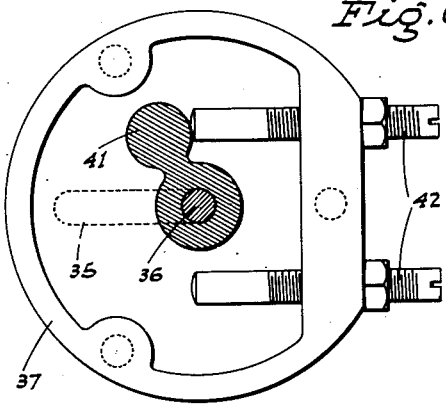
Fig. 6 is a cross section on line 6—6 of Fig. 5, showing the position of the radial stop when the crank unit is in position corresponding to one pre-set weight.
Figure 7:
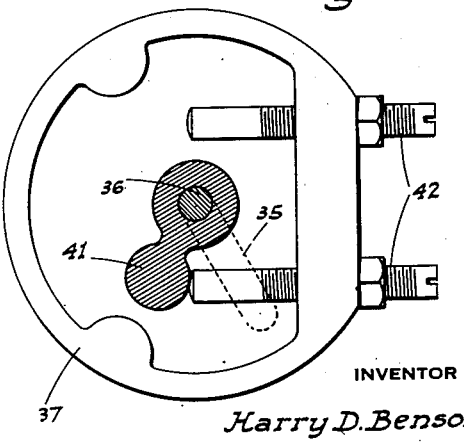
Fig. 7 is a similar view, but shows the crank unit in the other pre-set weight position, and beyond dead-center relative to the tension spring.

Referring now more particularly to the characters of reference on the drawings, the scales comprise a housing, indicated at 1, including an upstanding hollow neck 2 at the rear end of said housing, and in communication with the interior of the latter. At its upper end the hollow upstanding neck 2 is formed with a hollow head 3 having an arcuate front face 4 formed with an upstanding slot 5.

A pointer 6 is pivotally mounted in the head 3, as at 7, for swinging motion with the outer end of said pointer riding in the slot 5; there being a central marker 8 alongside the slot 5, and on which marker 8 the pointer 6 is adapted to read when the scales carry either one or the other of two weights, as hereinafter described.

The pointer 6 is actuated by a link 9 pivotally connected, as at 10, to an offset ear 11 on said pointer. At its lower end the link 9 pivotally connects, as at 12, with the rear end of a longitudinally extending top or main scale beam 13 within the housing 1 adjacent its upper end.

At its front end the main scale beam 13 is fixed in connection with a main pivot sleeve 14 which extends transversely of the housing in surrounding relation to a fixed cross shaft 15 supported between opposite sides of the housing 1 by screws 16. The main pivot sleeve 14 is freely turnable about the cross shaft 15, in anti-friction relation, by means of end supporting bearings 17. Another transverse sleeve 18 is welded to the front of the main pivot sleeve 14, and a cross shaft 19 is carried in said sleeve 18 by a spacer tube 20 running in end bearings 21; the cross shaft 19 and transverse sleeve 18 thus being relatively freely turnable in anti-friction relation.

A generally Y-shaped upstanding member or post 22 is disposed in the housing 1 adjacent the front thereof, and projects upwardly through a top opening 23 in said housing. The upper ends of the legs 24 of the post 22 are formed with generally U-shaped, inverted brackets 25 which are secured to a load platform 26 which is disposed at an upward and rearward incline above the housing 1 ahead of the neck 2.

The transverse sleeve 18 extends in relatively turnable relation between the legs 24 of the post 22, and the cross shaft 19 is secured, at its ends, to adjacent legs 24 by nuts 27.

The lower end of the post 22 is forked, as at 28, and straddles the front end of a bottom or stabilizer beam 29; being pivoted to the latter, as at 30. At its rear end the stabilizer scale beam 29 is pivoted in connection with the housing, as at 31. A dashpot unit 32 connects between the pivot 31 and the top or main scale beam 13 intermediate the ends of the latter in order to prevent teetering of the scale.

The scale is spring balanced by means of a tension spring 33 connected between a pin 34 on the main scale beam 13 intermediate its ends and a crank 35 on a shaft 36 which extends laterally through one side of the housing 1.

The crank shaft 35 and shaft 36 are part of a quick-change mechanism, by means of which the scale may be preset to indicate a load of one predetermined weight, or another predetermined weight, selectively; such quick-change mechanism comprising the following:

On the side of the housing 1 through which the shaft 36 projects, said housing is fitted with a generally circular case 37 having an inwardly projecting bearing hub 38 carrying the shaft 36. At its outer end the shaft 36 is fixed in connection with a rotary end plate 39 on the outer end of the case 37, which end plate includes a crank handle 40. Within the case 37 the end plate 39 is formed with a radial stop 41 surrounding the shaft 36; said radial stop being adapted to engage with one or the other of a pair of parallel set screws 42 which project into the case 37 on opposite sides of the shaft 36. The position of the radial stop 41 and the pair of set screws 42 is such that when the rotary end plate 39 is turned by the crank handle 40 to position the stop 41 in engagement with one set screw 42, the spring 33 is on one side of its dead-center line. When the rotary end plate is turned to engage the radial stop 41 with the other set screw 42, the spring 33 is on the opposite side of dead-center.

It is thus obvious that in one position of the spring 33, the corresponding set screw 42 may be adjusted to apply a predetermined tension to said spring, and such that with a master weight, of predetermined load, on the platform 26 the pointer 6 will read directly on the marker 8. Similarly in its opposite or beyond dead-center position, the spring 33 may be set by the other screw 42 to a tension corresponding to a different master weight placed on the platform 26, so as to again register pointer 6 with marker 8.

It should be noted that in its different positions, on opposite sides of dead-center, the spring 33, irrespective of the fine adjustment accomplished by set screws 42, is under different tensions, as the crank point throws between a lower and a relatively higher point. These different tensions make possible the use of the same scale assembly for weighing two different loads by merely switching the described quick-change mechanism from one position of the crank 35 to the other position.

When the described scales are in use, the quick-change mechanism is set to one weight position or the other, selectively, by the crank handle 40, and thereafter a box 43 is placed on the load platform 26; such box being filled with produce until the pointer 6 reads directly on the marker 8. The functioning of the scales is believed evident; the weight of the load as imposed on the Y-post 22 being imparted by the described sleeve and shaft arrangement to the top or main scale beam 13 with the cross shaft 15 as an axis. Thus, downward motion of the post 22 results in upward swinging of the scale beam 13, and upward thrust on the link 9 to actuate the pointer 6. Upward motion of the top or main scale beam 13 is resisted by the pre-set spring 33, while the bottom scale beam 29 serves as a stabilizer, teetering being prevented by the dashpot unit 32.

If, during box loading operations, the operator desires to load a box with the other weight than that for which the scales are set, the crank handle 40 is normally switched to its oppoiste position, whence the scales are then ready to weigh such different load with the pointer 6 reading relative to the marker 8.

The above described scales provide a convenient portable and ready device for the weighing of box loads, and in addition the quick-change mechanism makes it very easy for the operator to weigh different loads, while still being able to read the scales on the same marker which the operator's eye is accustomed to watch.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful and upon which Letters Patent are desired:

1. Spring balanced scales including a movable load support, a spring operatively connected at one end to the support, a weight-responsive pointer operatively connected to the support adapted to read on a fixed scale point under predetermined weight on the scales, and a crank unit connected to the spring to quick-change the initial loading thereof corresponding to different predetermined weights; the crank unit including a manually turnable shaft, and a crank on the shaft connected to the free end of the spring, the shaft being turnable to shift the crank and spring end between stop positions on opposite sides of dead-center relative to the spring.

2. Spring balanced scales including a movable load support, a spring operatively connected at one end to the support, a weight-responsive pointer operatively connected to the support adapted to read on a fixed scale point under predetermined weight on the scales, and a crank unit connected to the spring to quick-change the initial loading thereof corresponding to different predetermined weights; the crank unit including a manually turnable shaft, a crank on the shaft connected to the free end of the spring, the shaft being turnable to shift the crank and spring end between stop positions on opposite sides of dead-center relative to the spring, and adjustment elements operative to predetermine said stop positions.

3. Spring balanced scales including a movable load support, a spring operatively connected at one end to the support, a weight-responsive pointer operatively connected to the support adapted to read on a fixed scale point under predetermined weight on the scales, and a crank unit connected to the spring to quick-change the initial loading thereof corresponding to different predetermined weights; the crank unit including a manually turnable shaft, a crank on the shaft connected to the free end of the spring, a stop element on the shaft, the shaft being turnable to shift the crank and spring end between stop positions on opposite sides of dead-center relative to the spring, the spring being under differential initial loading at said stop positions, and adjustment elements adapted to be engaged by the stop element to predetermine said stop positions.

4. Spring balanced scales including a movable load support, a spring operatively connected at one end to the support, a weight-responsive pointer operatively connected to the support adapted to read on a fixed scale point under predetermined weight on the scales, and a crank unit connected to the spring to quick-change the initial loading thereof corresponding to different predetermined weights, the crank unit including a manually turnable shaft, a crank on the shaft connected to the free end of the spring, a stop element on the shaft, the shaft being turnable to shift the crank and spring end between stop positions on opposite sides of dead-center relative to the spring, the spring being under differential initial loading at said stop positions, and a pair of set screws mounted for engagement by the stop element in said stop positions whereby the set screws may be adjusted to predetermine said positions.

5. Spring balanced scales including a support, a movable scale beam having a scale platform operatively connected therewith, a pointer responsive to movement of the scale beam adapted to read on a fixed scale point under predetermined weight on the platform, a tension spring connected to the scale beam in opposition to motion of the scale platform under a weight, and a crank unit connected to the spring to quick-change the initial loading thereof corresponding to different predetermined weights; the crank unit including a manually turnable shaft, and a crank on the shaft connected to the free end of the spring, the shaft being turnable to shift the crank and spring end between stop positions on opposite sides of dead-center relative to the spring.

6. Spring balanced scales including an upstanding housing, a vertically movable scale beam extending longitudinally in the housing, a scale platform above the housing operatively connected to the scale beam, a pointer responsive to movement of the scale beam adapted to read on a fixed point under predetermined weight on the platform, a tension spring connected at one end to the scale beam in opposition to motion of the scale platform under a weight, and a crank unit connected to the spring to quick-change the initial loading thereof corresponding to different predetermined weights; the crank unit including a manually turnable shaft, and a crank on the shaft connected to the free end of the spring, the shaft being turnable to shift and crank and spring end between stop positions on opposite sides of dead-center relative to the spring.

7. Spring balanced scales including an upstanding housing, a vertically movable scale beam extending longitudinally in the housing, a scale platform above the housing operatively connected to the scale beam, a pointer responsive to movement of the scale beam adapted to read on a fixed point under predetermined weight on the platform, a tension spring connected at one end to the scale beam in opposition to motion of the platform under a weight, a shaft extending through one side of the housing, a crank on the shaft in the housing, the tension spring being connected at the other end to the crank, manually operative means exteriorly of the housing to turn the shaft, the shaft being turnable to shift the crank between stop positions on opposite sides of dead-center relative to the spring, the spring being under differential initial loading at said stop positions, and adjustment elements operative to predetermine said stop positions.

8. Spring balanced scales including an upstanding housing, a vertically movable scale beam extending longitudinally in the housing, a scale platform above the housing operatively connected to the scale beam, a pointer responsive to movement of the scale beam adapted to read on a fixed point under predetermined weight on the platform, a tension spring mounted at one end to the scale beam in opposition to motion of the platform under a weight, a shaft extending through one side of the housing, a crank on the shaft in the housing, the tension spring being connected at the other end to the crank, manually operative means exteriorly of the housing to turn the shaft, the shaft being turnable to shift the crank between stop positions on opposite sides of dead-center relative to the spring, the spring being under differential initial loading at said stop positions, and adjustment elements operative to predetermine said stop positions; the housing having a case on the corresponding side surrounding the shaft, and a stop on the shaft in the case, said adjustment elements being set screws projecting in spaced relation into the case.

9. Spring balanced scales which include a scale beam and a weight responsive pointer adapted to read on a fixed scale point under a predetermined weight on the scales, a helical spring having one end fixed to the scale beam, and a unit rockable between two positions mounted on the scales and including an element connected to the other end of the spring and arranged when in one position to hold the spring to one side of a dead center line and under a predetermined load, such unit upon rocking thereof to the other position being operative to throw the spring to the opposite side of such dead center line and hold it under a predetermined load different from that under which it was held on the other side of said dead center line.

HARRY D. BENSON.

REFERENCES CITED

The following references are of record in the file of this patent:

UNITED STATES PATENTS

| Number | Name | Date |
| --- | --- | --- |
| 322,870 | Turnbull | July 21, 1885 |
| 729,207 | Mulligan | May 26, 1903 |
| 1,332,116 | Ewing | Feb. 24, 1920 |
| 2,003,360 | Hansen | June 4, 1935 |